United States Patent
Hirota et al.

(10) Patent No.: US 6,889,554 B2
(45) Date of Patent: May 10, 2005

(54) METHOD OF ADJUSTING PRESSURE SENSOR

(75) Inventors: Hisatoshi Hirota, Hachioji (JP); Naoya Wanajo, Hachioji (JP)

(73) Assignee: TGK Co., Ltd., Tokyo (JP)

(*) Notice: Subject to any disclaimer, the term of this patent is extended or adjusted under 35 U.S.C. 154(b) by 182 days.

(21) Appl. No.: 10/247,023

(22) Filed: Sep. 19, 2002

(65) Prior Publication Data

US 2003/0041670 A1 Mar. 6, 2003

Related U.S. Application Data

(63) Continuation of application No. PCT/JP02/00528, filed on Jan. 24, 2002.

(30) Foreign Application Priority Data

Feb. 8, 2001 (JP) ........................................ 2001-032189
Oct. 10, 2001 (JP) ........................................ 2001-312498

(51) Int. Cl.⁷ .............................................. G01L 9/02
(52) U.S. Cl. ............................ 73/719; 73/720; 73/726
(58) Field of Search .......................... 73/719, 115, 720, 73/726

(56) References Cited

U.S. PATENT DOCUMENTS

| | | | |
|---|---|---|---|
| 5,481,905 A | | 1/1996 | Pratt ............................ 73/115 |
| 5,528,214 A | * | 6/1996 | Koga et al. ..................... 338/4 |
| 5,604,338 A | * | 2/1997 | Paxton et al. ............. 200/83 N |
| 6,050,146 A | * | 4/2000 | Nakamura et al. ............. 73/725 |
| 6,514,442 B1 | * | 2/2003 | Hiraoka et al. ............. 264/40.1 |

FOREIGN PATENT DOCUMENTS

| | | |
|---|---|---|
| JP | 56-145327 | 11/1981 |
| JP | 63-025525 | 2/1988 |
| JP | 03-003368 | 1/1991 |
| JP | 03-033630 | 2/1991 |
| JP | 2531924 | 1/1997 |
| JP | 09-257829 | 10/1997 |
| JP | 10-142087 | 5/1998 |

* cited by examiner

Primary Examiner—Edward Lefkowitz
Assistant Examiner—Andre Allen
(74) Attorney, Agent, or Firm—Patterson, Thuente, Skaar & Christensen, P.A.

(57) ABSTRACT

It is an object to provide a method of adjusting a pressure sensor, in which adjustment of a diaphragm portion and adjustment of an amplification circuit connected to the diaphragm portion are simplified. A flexible circuit board having the amplification circuit mounted thereon is connected to a diaphragm member having the diaphragm portion formed with gauge resistances, and offset, span and temperature-compensating adjustment resistances, and adjustment of the adjustment resistances formed on the diaphragm member is performed in this state. The adjustment on the side of the diaphragm member including the amplification circuit accommodates adjustment deviation on the amplification circuit, and hence adjustment of the whole pressure sensor can be achieved by a single adjustment process. The adjustment process thus simplified can reduce manufacturing costs.

8 Claims, 8 Drawing Sheets

METHOD OF ADJUSTING PRESSURE SENSOR

This application is a continuing application, filed under 35 U.S.C. §111(a) of International Application PCT/JP02/00528, filed on Jan. 24, 2002.

BACKGROUND OF THE INVENTION (1) Field of the Invention

This invention relates to a method of adjusting a pressure sensor, and more particularly to a method of adjusting a pressure sensor for use in detecting the pressure of a medium to be measured, such as a refrigerant gas used in an automotive air conditioner.

(2) Description of the Related Art

An automotive air conditioning system imposes a relatively large load on an engine that drives the system, and hence it is considered that the engine should be controlled optimally in accordance with an operating state of the air conditioning system. In the automotive air conditioning system, information necessary for engine control includes respective pressures on the suction side and the delivery side of a compressor directly driven by the engine, and the pressures are detected by using pressure sensors.

In general, it is required that the pressure of a refrigerant gas is electronically detected, so as to reduce the size and weight of the pressure sensors for the automotive air conditioner. To this end, there is employed a pressure sensor produced by forming a thin diaphragm portion at a central portion of a silicon substrate, and printing a conductor pattern and a resistance pattern for wiring on the surface of the diaphragm portion to form semiconductor strain gauge resistances, thereby forming a Wheatstone bridge using the resistances.

The pressure sensor of the above-mentioned kind is suitable for mass production by the IC manufacturing process, but changes in temperature considerably affect the characteristics of the strain gauge resistances. As a solution to this problem, i.e. with a view to compensating for the temperature characteristics, Japanese Patent Publication (Kokoku) No. 59-41134 proposed a pressure sensor in which a resistance circuit for correction of a temperature-dependent error is formed on a non-deformable portion of the diaphragm portion, which is insensitive to pressure, and a pressure signal by gauge resistances is corrected by the resistance value of the resistance circuit, and then output.

Another pressure sensor is disclosed in Japanese Laid-Open Utility Model Publication (Kokai) No. 2-89339, which integrally includes a diaphragm portion having strain gauge resistances formed thereon, and an amplification circuit connected to the output terminal of the gauge resistances on the diaphragm portion, for amplifying an output voltage varying with a change in the resistance value of the gauge resistances to output the resulting voltage.

In the pressure sensor constructed as above, characteristics of an offset, temperature drift, and a span voltage of the gauge resistances of the diaphragm portion are adjusted, and further, characteristics of an offset and the like of the amplification circuit are adjusted, to thereby reduce a measurement error as a whole.

However, in the conventional pressure sensor, it is necessary to carry out separate adjustment operations on the diaphragm side and on the amplification circuit side, in a manner such that the diaphragm portion has the predetermined characteristics, and the amplification circuit also has its characteristics adjusted, which complicates the process of adjusting the pressure sensor.

Further, to reduce the measurement error, there are formed adjustment resistance circuits for compensating for the resistance values of the gauge resistances, and a linear dividing line is formed on each adjustment resistance circuit by laser trimming, whereby a total output voltage from the circuit is adjusted.

However, in a small-sized sensor which cannot allocate a large area for the adjustment resistance circuits, the length of a dividing line by the laser-trimming does not necessarily correspond to the resistance value. Particularly when a resistance formed on a wiring pattern suffers from print deviation, it is difficult to adjust a value of voltage to be applied to the gauge resistances, because adjustment of the output voltage by laser trimming is limited.

SUMMARY OF THE INVENTION

The present invention has been made in view of the above points, and an object thereof is to provide a method of adjusting a pressure sensor, which can simplify the adjustment process.

To attain the above object, the present invention provides a method of adjusting a pressure sensor having a pressure sensitive section including gauge resistances attached to a pressure application surface of the pressure sensitive section, and adjustment resistances attached to a non-strainable surface of the pressure sensitive section, the pressure sensitive section being strained by pressure introduction of a medium to be measured, the gauge resistances each having a resistance value varying according to an amount of strain of the pressure application surface, and an amplification circuit for amplifying a pressure detection signal from the pressure sensitive section, wherein the adjustment resistances of the pressure sensitive section are trimmed in a state of the pressure sensitive section and the amplification circuit being connected to each other, to thereby adjust characteristics of pressure detection output of the pressure sensor which is output through the amplification circuit.

According to this method of adjusting a pressure sensor, in the state of the unadjusted pressure sensitive section and the unadjusted amplification circuit being connected to each other, the adjustment resistances of the pressure sensitive section are adjusted while measuring characteristics of pressure detection of the amplification circuit, whereby adjustment required for the amplification circuit can be accommodated by adjustment carried out on the adjustment resistances of the pressure sensitive section. This makes it possible to adjust the pressure sensor by going through adjustment of the pressure sensitive section only once, thereby simplifying the adjustment process.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

First Embodiment

The invention will now be described in detail with reference to drawings showing a preferred embodiment thereof in which the invention is applied to a pressure sensor for detecting the pressure of a refrigerant gas used in an automotive air conditioner.

Figure 1:
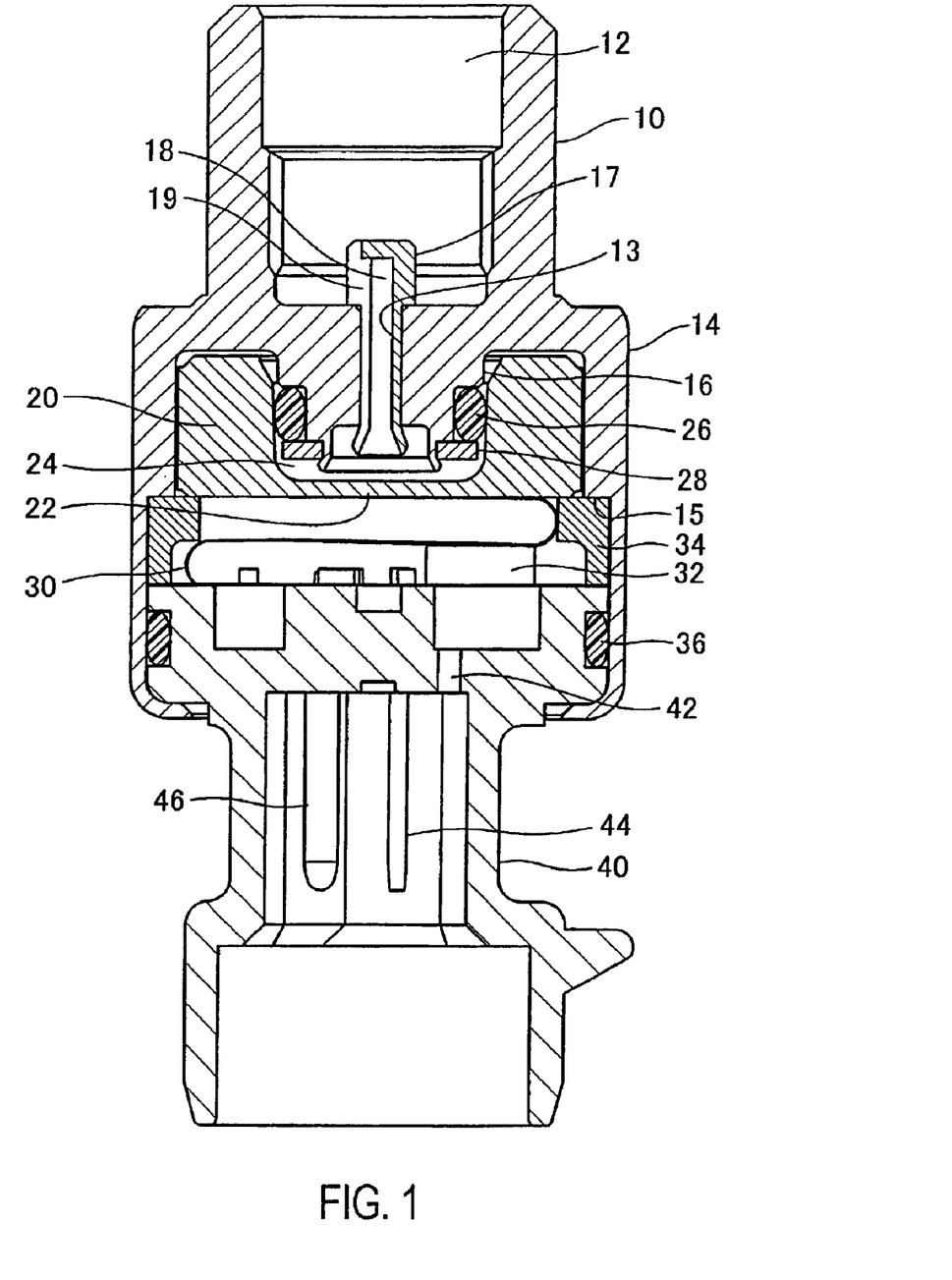
FIG. 1 is a cross-sectional view showing the construction of a pressure sensor.

FIG. 1 is a cross-sectional view showing the construction of the pressure sensor.

The pressure sensor shown in the figure is used for detecting the pressure of a refrigerant gas used in an automotive air conditioner and comprised of a housing member 10, a diaphragm member 20, a flexible circuit board 30, and a connector member 40.

The housing member 10 is comprised of a connector portion 12 for introducing the refrigerant gas from piping of a refrigerating cycle of the automotive air conditioner, an outer hollow cylindrical portion 14 formed on the opposite side to the connector portion 12, and a hollow cylindrical projection 16 integrally formed with the housing member 10 within the outer hollow cylindrical portion 14. The housing member 10 has an insertion hole 13 formed along the axis of the hollow cylindrical projection 16, for having a pin 17 made e.g. of a resin inserted therein. The pin 17 in a hollow cylindrical form is inserted from the connector portion side 12 of the housing member 10 and prevented from falling off by its crimped lower end portion. The pin 17 presses and opens a valve arranged in the piping of the air conditioning system when the piping is connected to the connector portion 12, and is comprised of a hollow portion 18 having a closed upper end and extending along its axis and a slit 19 formed through a side wall thereof.

The diaphragm member 20 is formed of ceramics and fitted in the hollow cylindrical projection 16 of the housing member 10. The diaphragm member 20 is formed with a hollow portion 24 having a hollow cylindrical shape corresponding to the hollow cylindrical projection 16 of the housing member 10, and a central portion of the diaphragm member 20 forms a diaphragm portion 22. The inside of the outer hollow cylindrical portion 14 is formed with a step portion 15 in flush with a face of the diaphragm portion 22.

A plurality of gauge resistances are attached to a surface of the diaphragm portion 22 on a side opposite to the hollow portion 24 to form a strain gauge for measuring the amount of strain of the diaphragm portion 22 caused by introduction of the pressure of the refrigerant gas. The hollow portion 24 of the diaphragm member 20 is air-tightly fitted on the hollow cylindrical projection 16 of the housing member 10 via an O ring 26 fitted on the same. The O ring 26 is held in contact with an inner peripheral surface of the hollow portion 24 and prevented from falling off by a washer 28 fixedly fitted on the hollow cylindrical projection 16 of the housing member 10.

The pin 17 introduces the pressure of the refrigerant gas into the diaphragm member 20 from the connector portion 12 through communication of the internal hollow portion 18 with the slit portion 19 formed in the side wall thereof. The diaphragm portion 22 is held at a location a predetermined distance away from an opposed end of the pin 17 in a manner such that the central portion of the diaphragm portion 22 is exposed to the refrigerant gas. Due to this configuration, the diaphragm portion 22 is deformed in response to the pressure of the refrigerant gas applied to the central portion thereof.

The flexible circuit board 30 electrically connects between the gauge resistances attached to the diaphragm portion 22 and a measurement circuit comprised of circuit components 32 including an amplifier. The flexible circuit board 30 connected to the diaphragm member 20 is received in the inside of a hollow cylindrical stopper member 34 in the state where it is folded up in the shape of S character. During pressure measurement, the stopper member 34 is held in contact with the step portion 15 formed in flush with the face of the diaphragm portion 22, so that it is possible to prevent the diaphragm member 20 from moving toward the circuit components 32 within the outer hollow cylindrical portion 14 of the housing member 10.

The connector member 40 is fitted in the outer hollow cylindrical portion 14 of the housing member 10 via a waterproofing O ring 36 to form an airtight structure, to thereby fix the stopper member 34 within the outer hollow cylindrical portion 14. Attached to the upper surface of the connector member 40 is a portion of the flexible circuit board 30 on which an amplification circuit comprised of the circuit components 32 is mounted. The amplification circuit and the gauge resistances attached to the surface of the diaphragm member 20 are electrically connected to each other by the flexible circuit board 30 to form the measurement circuit. Further, the connector member 40 is formed with a through hole 42 for communicating between a space formed on the side of the diaphragm portion 22 opposite to the surface thereof which receives pressure and an outside air such that the pressure within the space becomes equal to the atmospheric pressure.

The connector portion 40 is formed with a signal output terminal 44 via which a measurement circuit output signal is output and a resin connection pin 46 for having a connector fitted thereon. The signal output terminal 44 is connected to an air conditioning control circuit, not shown, and an engine control circuit, not shown, for supplying pressure measurement data to the circuits. The air conditioning control circuit and the engine control circuit carry out close control of a compressor, a fan of a condenser, an engine rotational speed, and so forth, which makes it possible to enhance the operation efficiency of the air conditioner and perform optimal fuel consumption control of the engine.

Next, description will be given of a pressure sensitive circuit incorporated in the pressure sensor.

Figure 2:
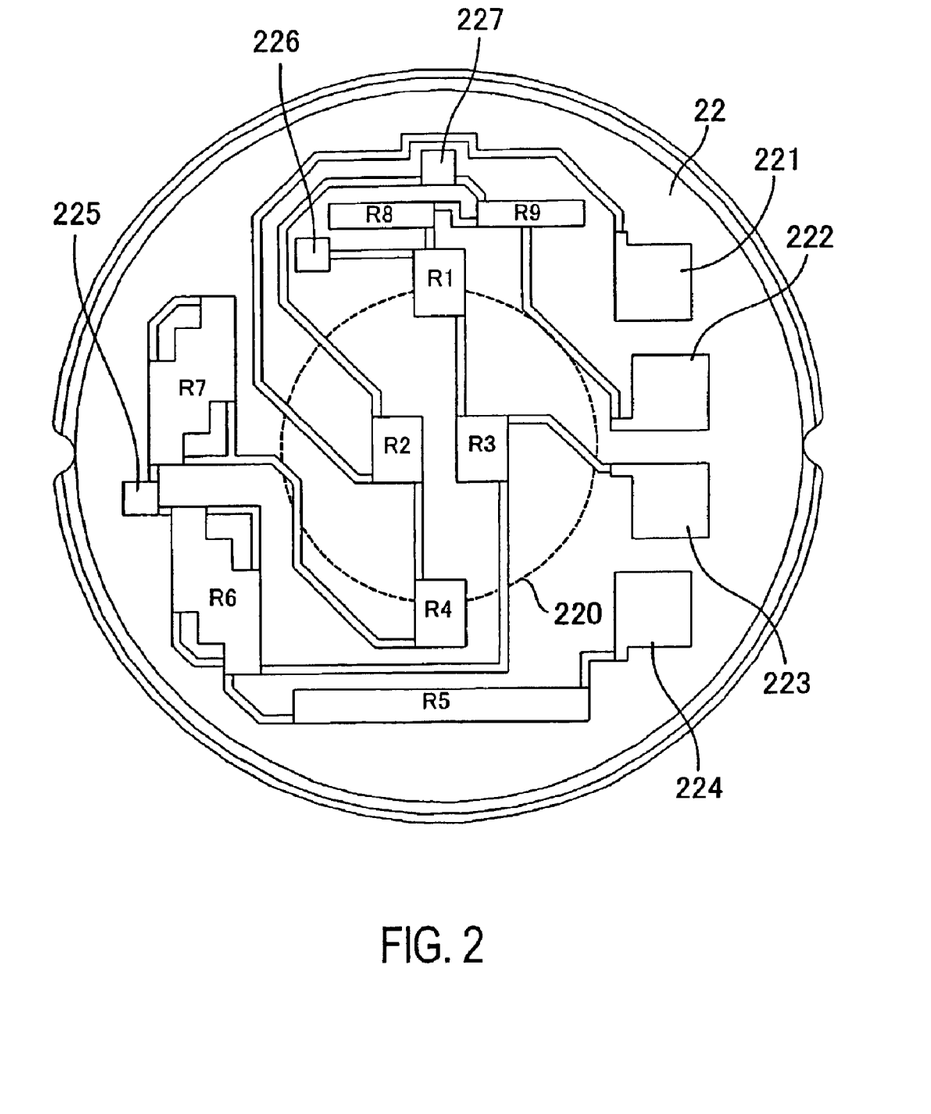
FIG. 2 is a plan view showing a diaphragm portion of the pressure sensor.

FIG. 2 is a plan view showing the diaphragm portion forming the pressure sensitive circuit.

The diaphragm portion 22 has the central portion thereof formed with a thin strainable portion 220 which can be strained by the pressure of the refrigerant gas introduced via the pin 17. The diaphragm member 20 has the underside surface thereof printed with a resistor layer providing the gauge resistances R1 to R4 together with a conductor layer for a wiring pattern such that they form a Wheatstone bridge circuit. The four gauge resistances R1 to R4 functions as strain gauges, and the resistances R2, R3 are arranged in the vicinity of the center of the strainable portion 220 of the diaphragm portion 22, while the resistances R1, R4 are each arranged at a location a striding a non-deformable portion of the diaphragm portion 22 and a periphery of the strainable portion 220 of the same.

Further, arranged on the non-deformable portion of the diaphragm portion 22 are five adjustment resistances R5 to R9 and electrode pads 221 to 227, which are connected to each other by a wiring pattern. The adjustment resistance R5 is a span adjustment resistance for setting a voltage variation range of a desired output voltage. The adjustment resistances R6, R7 are offset adjustment resistances, and the adjustment resistances R8, R9 are for compensating for temperature drift. The adjustment resistances R5 to R9 are each trimmed in a state connected to the amplification circuit, whereby pressure detection characteristics including the output characteristic of the amplification circuit are adjusted. The electrode pad 225 is used for performing trimming while measuring the resistance value of the adjustment resistance R5 when the span of the desired output voltage is adjusted. The electrode pads 226, 227 are used for performing trimming while measuring the respective resistance values of the adjustment resistances R8, R9 when the temperature drift of the offset voltage is compensated for.

Figure 3:
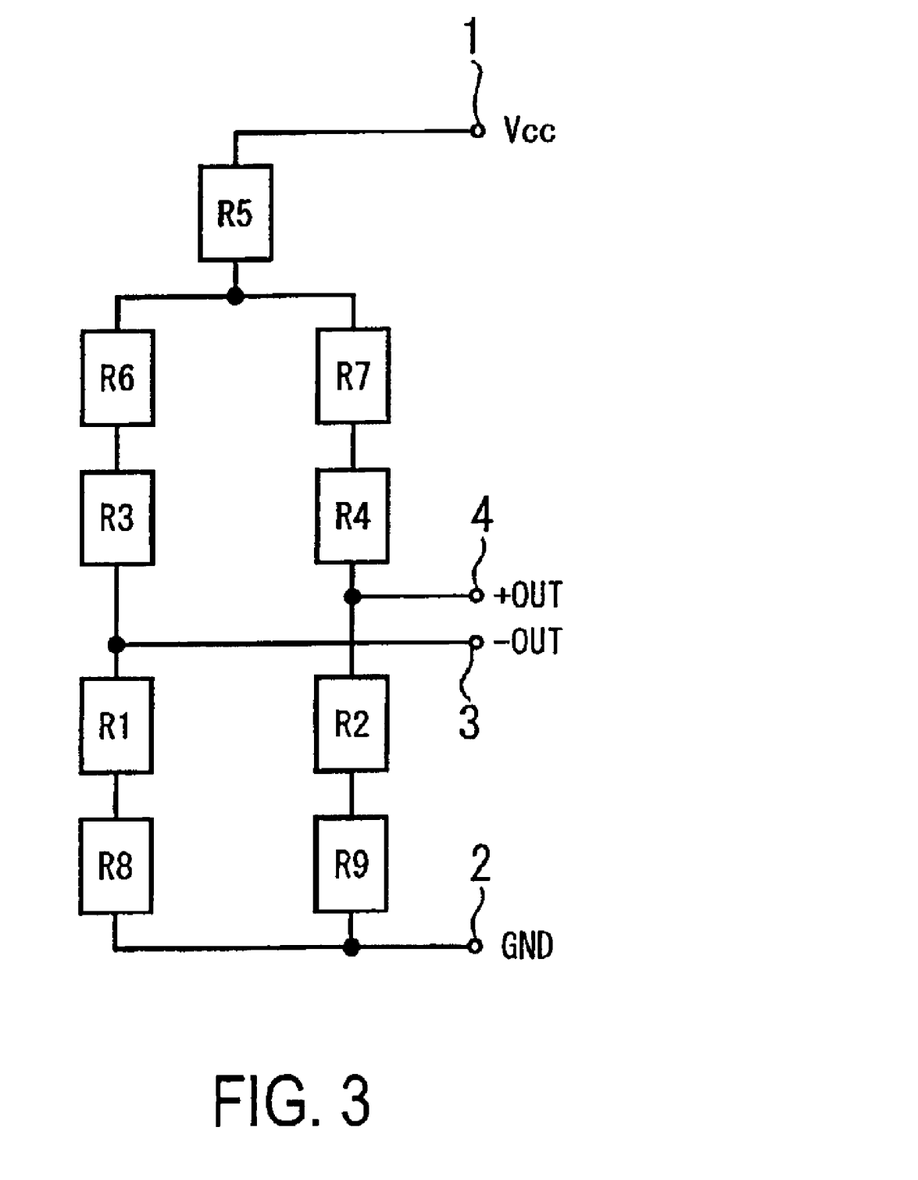
FIG. 3 is a view showing a Wheatstone bridge circuit formed on a diaphragm member.

FIG. 3 shows the Wheatstone bridge circuit formed on the diaphragm member.

The Wheatstone bridge circuit formed on the face of diaphragm member 22 is constituted by parallel connection of the resistances R6, R3, R1, R8 connected in series and the resistances R7, R4, R2, R9 connected in series. The Wheatstone bridge circuit has one end thereof connected via the span adjustment resistance R5 to a power-supply terminal 1 to which a voltage Vcc is applied, and the other end thereof connected to a ground (GRD) terminal 2.

In the series resistance circuit of the resistances R8, R1, R3, R6, the junction between the resistances R1, R3 is connected to an output terminal 3 for a –OUT voltage signal while in the series resistance circuit of the resistances R9, R2, R4, R7, the junction between the resistances R4, R2 is connected to an output terminal 4 for a +OUT voltage signal.

When the diaphragm portion 22 having received the pressure of the refrigerant gas is strained, the central portion of the surface of the diaphragm portion 22, on which the Wheatstone bridge circuit is formed, swells, so that out of the resistances R1 to R4, the resistances R2, R3 which are mounted in the vicinity of the center of the strainable portion are each deformed in a direction of expansion of a thick film chip, whereby the resistance values thereof are increased. On the other hand, the resistances R1, R4 arranged at the respective locations a striding the strainable portion and the non-deformable portion are each deformed in a direction of contraction of the thick film chip, and hence the resistance values thereof are reduced. Accordingly, with an increase in the pressure of the refrigerant gas applied to the diaphragm portion 22, the –OUT voltage signal of the pair of voltage signals becomes lower, and the +OUT voltage signal of the same becomes higher. As a result, a voltage signal proportional to a ratio of a change in the resistance values to the original resistance values is output from the output terminals 3, 4, and this voltage can be detected as pressure measurement data.

However, there is a very large variation in the resistance value of each of the resistances R1 to R9 if they are formed simply by printing. This causes an offset voltage to be generated in the pressure measurement data when there is a difference between the resistance value of the series resistance circuit of the resistances R1, R3 and that of the series resistance circuit of the resistances R4, R2, or when the respective ratios of changes in the resistance values responsive to a degree of strain of the diaphragm portion 22 to their original resistance values are different from each other. Further, when the respective resistance values of the resistances R1 to R9 change in response to a change in the ambient temperature at respective different rates, temperature drift occurs in the pressure measurement data. Moreover, an offset voltage or temperature drift can also be caused in the amplification circuit for amplifying the voltage signal obtained from the Wheatstone bridge circuit.

For this reason, it is necessary to adjust those of the diaphragm member 20 and the amplification circuit. In the pressure sensor of the present invention, regarding the gauge resistances and the amplification circuit as a unitary circuit, the resistance values of the adjustment resistances R5 to R9 arranged on the non-deformable portion of the diaphragm member 20 are adjusted prior to assembling of the pressure sensor, using the procedure described below, thereby ensuring that the pressure sensor has predetermined pressure detection characteristics.

Next, description will be given of a method of adjusting the pressure detection characteristics of the pressure sensor by trimming the resistances R5 to R9.

Figure 4:
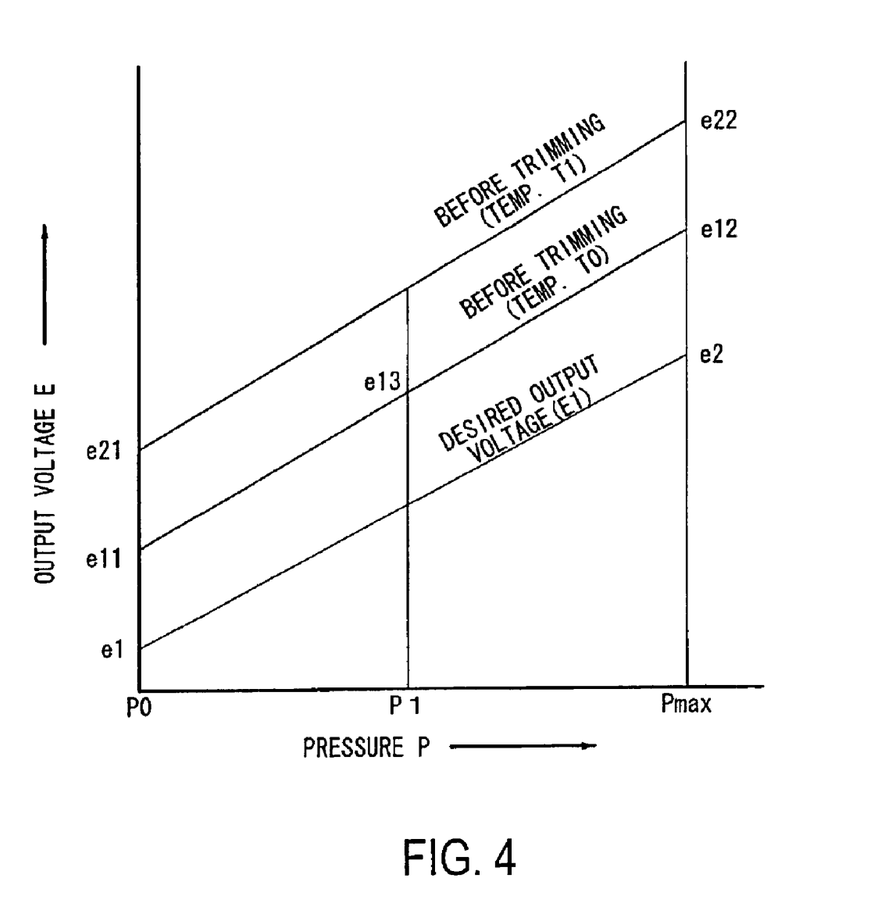
FIG. 4 is a diagram showing the relationship between a pressure applied to the diaphragm portion and an output voltage.

FIG. 4 shows the relationship between the pressure applied to the diaphragm portion and the output voltage.

The abscissa in the figure represents the pressure P applied to the diaphragm portion 22, while the ordinate represents the output voltage E of the amplification circuit. In the figure, it is assumed that the pressure detection characteristics are adjusted such that as the pressure P changes from a reference pressure P0 (e.g. the atmospheric pressure) to a maximum pressure Pmax (e.g. 33 MPa) measurable, a desired output voltage (E1) to be output from the pressure sensor changes from a voltage e1 corresponding to the reference pressure P0 to a voltage e2 corresponding to the maximum pressure Pmax.

In order to adjust the output voltage of the pressure sensor as above, the following steps (1) to (6) are executed while measuring the output voltage from the Wheatstone bridge circuit in a state of the Wheatstone bridge circuit being connected to the amplification circuit.

(1) Primary Trimming

First, since the respective resistance values of the resistances R1 to R9 mounted on the diaphragm portion 22 show a significant variation, the primary trimming adjustment is performed as a preparation to such an extent as will enable adjustment of the resistance values. More specifically, the power supply voltage Vcc is applied, and the offset adjustment resistance R6 or R7 is trimmed such that an output voltage to be obtained by application of the reference pressure P0 becomes equal to the predetermined voltage (offset voltage) e1.

Still more specifically, in the primary trimming, if the output voltage of the amplification circuit measured before the adjustment is smaller than the voltage e1, the adjustment resistance R6 connected to the output terminal 3 for the –OUT voltage is trimmed to increase the resistance value of the resistance R6. On the other hand, if the measured voltage before the adjustment is larger than the voltage e1, the resistance R7 connected to the output terminal 4 for the +OUT voltage is trimmed to increase the resistance value of the resistance R7.

The primary trimming is executed when of the gauge resistances and the adjustment resistances mounted on the diaphragm portion 22 have resistance value variations due to a problem in the manufacturing process or the like. Therefore, so long as the gauge resistances and the adjustment resistances are essentially formed with few variations, it is not necessarily required to execute the primary trimming.

(2) Span Measurement

Then, span measurement is performed. More specifically, the power supply voltage Vcc is applied, and the ambient temperature is set to a temperature T0 (ordinary temperature). In this state, respective output voltages of the amplification circuit responsive to the reference pressure P0 and the maximum pressure Pmax are measured to thereby determine a span voltage (e12–e11). Actually, if the output voltage responsive to the maximum pressure Pmax is deviated in an increasing direction, the output voltage of the amplification circuit can be saturated. To avoid the saturation, the output voltage E is measured after setting the pressure to be applied to the diaphragm portion 22 to e.g. an arbitrary intermediate pressure P1 between the reference pressure P0 and the maximum pressure Pmax, and then the rate of change (inclination) in the voltage is determined based on the measurement to determine the output voltage e12 corresponding to the maximum pressure Pmax by calculation.

(3) Temperature Drift Measurement

Then, temperature drift is measured. More specifically, the output voltage of the amplification circuit responsive to the reference pressure P0 is measured when the ambient temperature is set to the temperature T0 (ordinary temperature=approximately 25) and measured when the same is set to a temperature T1 (e.g. a highest available temperature 85) higher than the temperature T0 by predetermined degrees, to thereby obtain an offset voltage e11 and an offset voltage e21. Further, the output voltage e12 corresponding to the maximum pressure Pmax is calculated beforehand based on the offset voltage e11 at the normal temperature and the inclination obtained by the preceding step.

It should be noted that the temperatures for drift measurement may include not only the temperature T0 and the maximum temperature T1, but also a plurality of arbitrary points between a minus temperature and the maximum temperature T1.

(4-1) Trimming of PCT (Positive Temperature Coefficient) Resistors

Then, the temperature-compensating adjustment resistances (PCT resistances) R8, R9 are trimmed. More specifically, if e11<e21 holds for the offset voltages e11, e21 obtained in the measurement step (3), the resistance R8 connected to the output terminal 3 for the −OUT voltage is trimmed to increase the resistance value of the resistance R8, whereas if e11>e21 holds, the resistance R9 connected to the output terminal 4 for the +OUT voltage is trimmed to increase the resistance value of the resistance R9, whereby the adjustment is made such that there occurs no drift due to a change in the ambient temperature.

To carry out the trimming, a trimmed resistance is calculated based on data of the measured offset voltages e11, e21, and then the adjustment resistance R8 or R9 is trimmed such that the resulting resistance becomes equal to the trimmed resistance. The trimming is performed by the laser trimming method in which the adjustment resistance R8 or R9 is cut by a laser beam to change its resistance value to a predetermined resistance value. In the present embodiment, since typical resistance values of the adjustment resistances R8, R9 at the temperatures T0, T1 before trimming as well as typical resistance values of the temperature-independent gauge resistances R1 to R4, the span adjustment resistance R5, and the offset adjustment resistances R6, R7 are already known, a trimming length for cutting is calculated from a value of the trimmed resistance obtained by the calculation and the offset voltages e11, e21, and then the adjustment resistance R8 or R9 is trimmed by the trimming length. The length of a resistance element in a direction of a point of cutting has a predetermined relationship with resistance values of the resistance element before and after trimming, and hence it is possible to determine the trimming length by calculation based on the relationship.

For more precision, a method may be employed in which the adjustment resistances R8 and R9 are trimmed such that the resistance values thereof become equal to the trimmed resistances calculated in advance, while actually measuring the resistance values of the adjustment resistances R8 and R9 by using the measurement electrode pads 226, 227 formed on the diaphragm portion 22.

(5-1) Trimming of Span Adjustment Resistor

Then, the span voltage is adjusted. In this step, a resistance value of the span resistance R5 after trimming is calculated from data of the voltages e11, e13 obtained by the span measurement and the output voltage e12 corresponding to the maximum pressure Pmax, which is calculated based on the inclination of the span voltage obtained from the voltages e11, e13 and the offset voltage e11 obtained by the temperature drift measurement, and then, similarly to the trimming of the adjustment resistances R8, R9, a trimming length for cutting is calculated, and the span adjustment resistance R5 is trimmed by the length.

Alternatively, also similarly to the trimming of the adjustment resistance R8 or R9, the trimming of the adjustment resistance R5 may be performed while directly measuring the resistance value of the same. In this case, a voltage across the adjustment resistance R5 is actually measured by using the measurement electrode pad 225 formed on the diaphragm portion 22, and then the adjustment resistance R5 is trimmed such that the ratio of the voltage across the resistance R5 to the power supply voltage Vcc applied becomes equal to a ratio calculated from a ratio of the calculated trimmed resistance value of the span resistance R5 to the resistance of the Wheatstone bridge circuit.

(6) Final Trimming

Finally, the offset adjustment resistance R6 or R7 is subjected to the final trimming. This trimming is carried out because the offset voltage adjusted in the first step deviates from the desired voltage e1 during the processes of trimming the temperature-compensating adjustment resistance R8 or R9 and the span adjustment resistance R5. In the present step, the offset adjustment resistance R6 or R7 is trimmed again such that the output voltage from the amplification circuit responsive to the reference pressure P0, i.e. the offset voltage, becomes equal to the desired voltage e1.

As described above, for the gauge resistances R1 to R4, only the adjustment resistances R5 to R9 are trimmed such that the output voltage of the amplification circuit becomes equal to the desired value, whereby it is possible to eliminate not only temperature drift in the state of the amplification circuit being connected to the measurement circuit, but also differences in the output voltage characteristic among products. Further, it is possible to cause the offset voltage to agree with the desired value, and to perform offset adjustment by a single process.

Next, the circuit configuration of the pressure sensor will be described.

Figure 5:
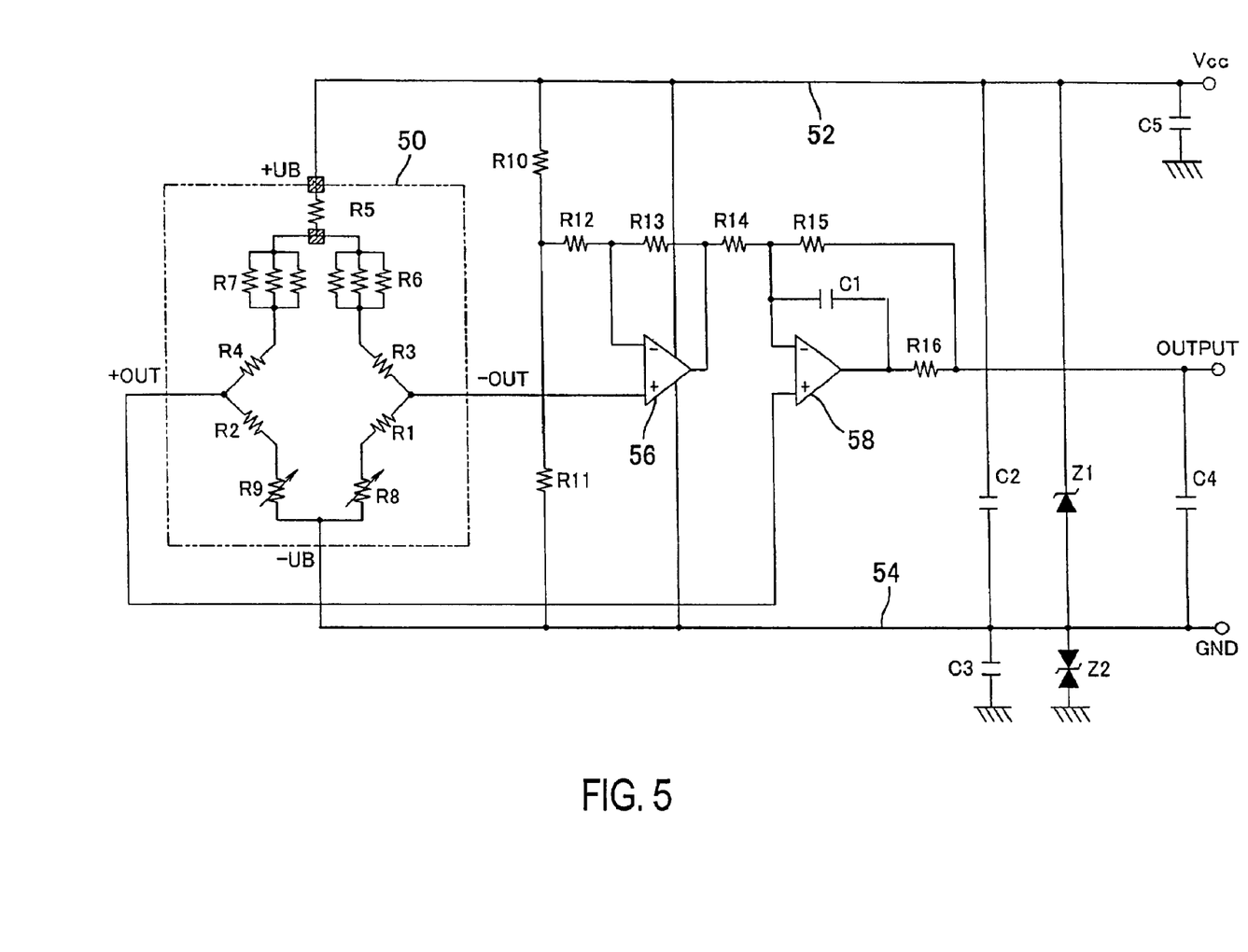
FIG. 5 is a circuit diagram showing the whole circuitry of the pressure sensor.

FIG. 5 is a circuit diagram showing the whole circuitry of the pressure sensor.

In the figure, a portion enclosed by two-dot chain lines is a resistance circuit 50 comprised of the resistances R1 to R9 printed on the diaphragm portion 22. The resistance circuit 50 has power-supply terminals +UB, −UB and signal output terminals +OUT, −OUT. The power-supply terminal +UB is connected to a power line 52 via which the power supply voltage Vcc is supplied, while the power-supply terminal −UB is connected to a ground line 54.

The signal output terminals +OUT, −OUT of the resistance circuit 50 are connected to the amplification circuit comprised of two operational amplifiers 56, 58, and the output of the amplification circuit is connected to an output terminal OUTPUT. The amplification circuit has resistances R10, R11 for setting a reference potential, resistances R12 to R15 for determining a gain, and an output resistance R16. Further, the amplification circuit is provided with capacitors C1 to C5, a Zener diode Z1, and a surge absorbing element Z2 for absorbing high voltage/high frequency noise superposed on each line.

A pressure detection signal detected by the resistance circuit 50 is amplified by the two-stage amplification circuit comprised of the operational amplifiers 56, 58 and then output from the output terminal OUTPUT.

Next, description will be given of a procedure of assembling the pressure sensor.

Figure 6:
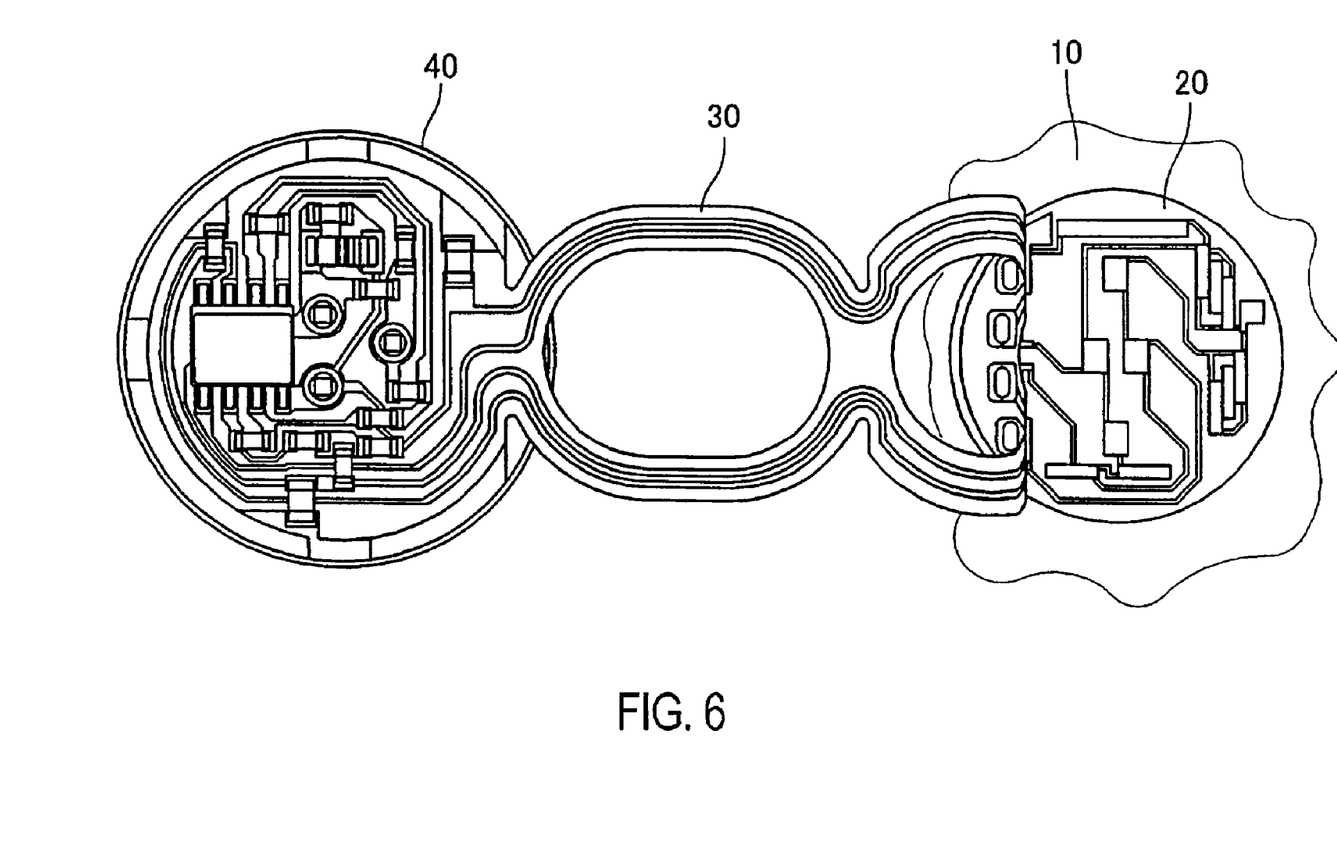
FIG. 6 is a plan view showing the pressure sensor being adjusted.
Figure 7:
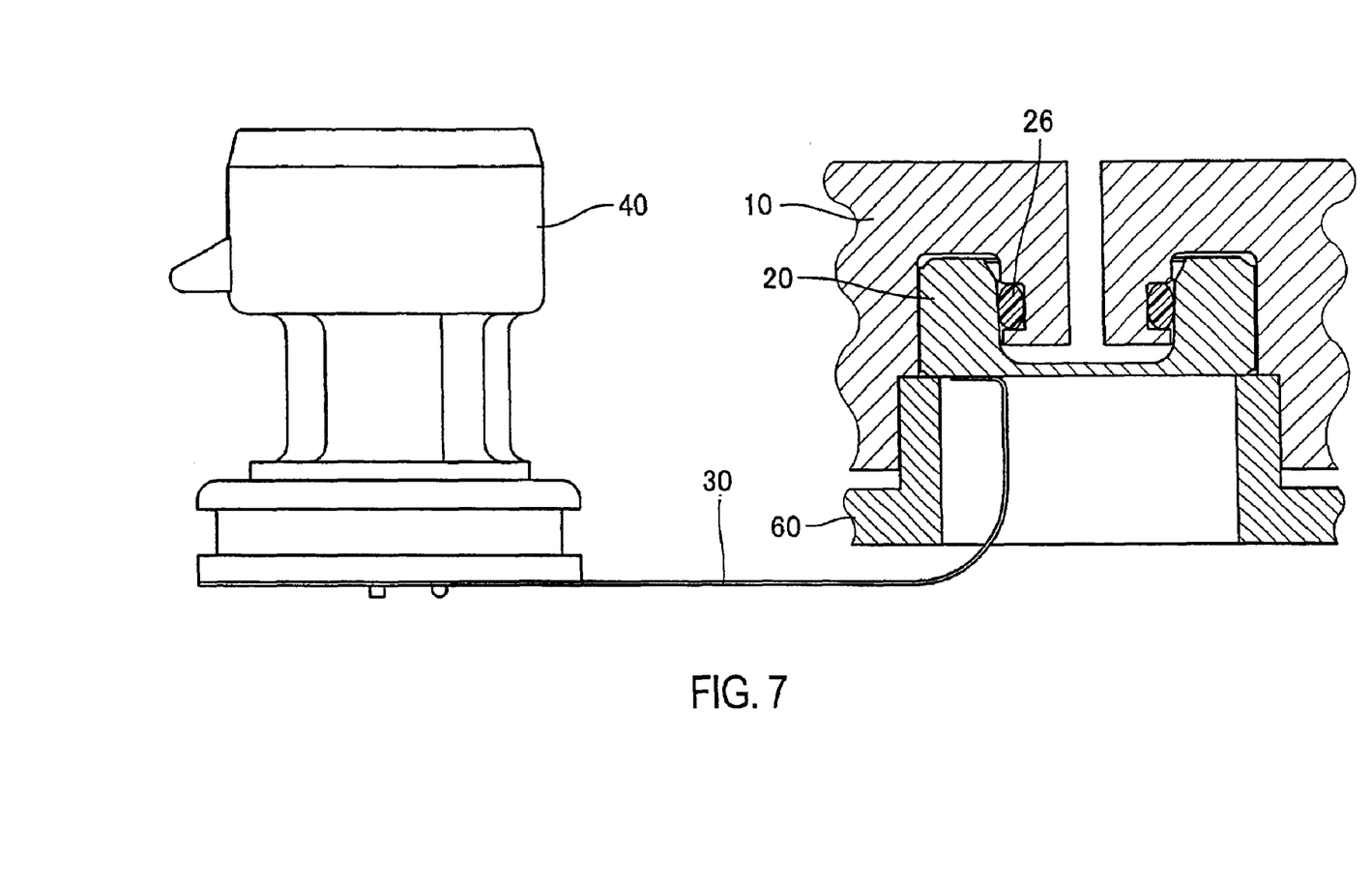
FIG. 7 is a side view, partly in section, showing the pressure sensor being adjusted.

FIG. 6 is a plan view showing the pressure sensor being adjusted, while FIG. 7 is a side view, partly in section, showing the pressure sensor being adjusted.

The pressure sensor is assembled by the following procedure: First, the flexible circuit board 30 on which the elements forming the amplification circuit are mounted is soldered to the signal output terminal of the connector member 40, and similarly, connection terminals of the flexible circuit board 30 are soldered to the electrode pads formed on the diaphragm member 20 whose adjustment resistances and so forth are not yet adjusted.

Then, the diaphragm member 20 is mounted in the housing member 10 (or attached to a pressure-introducing jig), and the housing member 10 (or the pressure-introducing jig) is attached to a jig 60. Then, adjustment of the gauge resistances is carried out by measuring the output voltage of the amplification circuit, calculating the trimmed resistance value, and trimming the adjustment and compensation resistances mounted on the diaphragm member 20, while introducing a pressure into the housing member 10 or while changing the ambient temperature, as required. This adjustment is performed through the amplification circuit, and hence the offset adjustment of the amplification circuit is carried out at the same time.

After completion of the adjustment of the gauge resistances, the housing member 10 is detached from the jig 60 (or the diaphragm member 20 is detached from the pressure-introducing jig and the jig 60). Then, as shown in FIG. 1, the connector member 40 is fitted in the outer hollow cylindrical portion 14 of the housing member 10 via the stopper member 34 and fixed to the housing member 10 by crimping the lower end portion of the outer hollow cylindrical portion 14. Thus, the assembly of the pressure sensor is completed.

Second Embodiment

Next, description will be given of another example of the method of adjusting a pressure sensor for detecting the pressure of a refrigerant gas within an automotive air conditioner.

Figure 8:
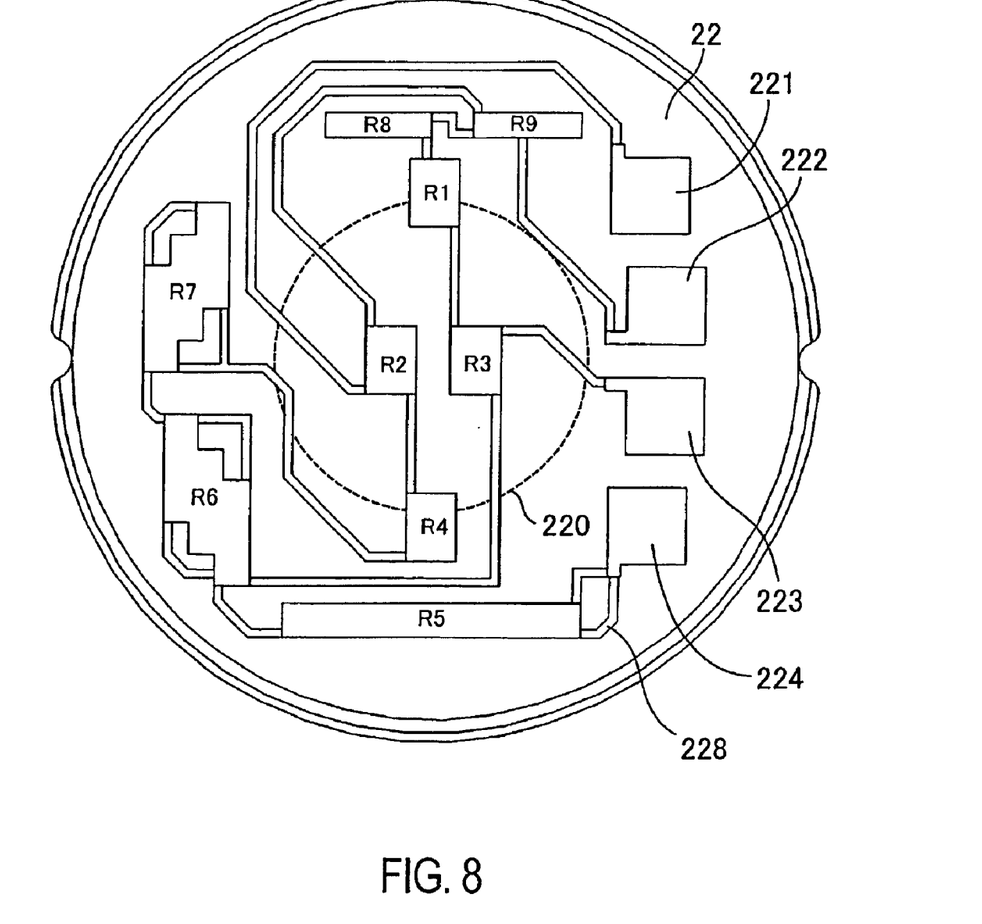
FIG. 8 is a plan view showing a diaphragm portion forming a pressure sensitive circuit different from a pressure sensitive circuit shown in FIG. 2.

FIG. 8 is a plan view showing a diaphragm portion forming a pressure sensitive circuit. This diaphragm portion corresponds to the diaphragm portion of FIG. 2 described in the first embodiment. The pressure sensor is identical in construction to the pressure sensor of the first embodiment (see FIG. 1).

The diaphragm portion 22 has the central portion thereof formed with a thin strainable portion 220 which can be strained by the pressure of the refrigerant gas introduced via the pin 17. The diaphragm member 20 has the underside surface thereof printed with a resistor layer providing the gauge resistances R1 to R4 together with a conductor layer for a wiring pattern such that they form a Wheatstone bridge circuit. The four gauge resistances R1 to R4 function as strain gauges, and the resistances R2, R3 are arranged in the vicinity of the center of the strainable portion 220 of the diaphragm portion 22, while the resistances R1, R4 are each arranged at a location a striding a non-deformable portion of the diaphragm portion 22 and a periphery of the strainable portion 220 of the same.

The diaphragm portion in the present embodiment is distinguished from the diaphragm portion of FIG. 2 in that the electrode pad 225 and the electrode pads 226, 227 are not formed, and that there is formed a wiring pattern 228 for short-circuiting a span adjustment resistance R5 such that the Wheatstone bridge circuit and an electrode pad 224 (power-supply terminal) are connected.

Then, the adjustment resistances R5 to R9 are trimmed, whereby the output detection characteristics of the pressure sensor are adjusted. Steps of (1) primary trimming, (2) span measurement, (3) temperature drift measurement, and (6) final trimming included in this adjustment method are similar to those in the method of the first embodiment, and hence description thereof is omitted. Now, (4-2) trimming of PTC resistances and (5-2) trimming of span adjustment resistance will be described with reference to FIGS. 3 and 4.

(4-2) Trimming of PTC Resistances

In trimming of the temperature-compensating adjustment resistances (PTC resistances) R8, R9, the electrode pads 226, 227 are not used, but a predicted value of an output voltage to be output from the amplification circuit when a predetermined voltage is applied to the pressure sensitive section is calculated based on the temperature drift of the offset voltage measured in the step of temperature drift measurement, and one of the adjustment resistances R8, R9 is trimmed until an actual output voltage from the amplification circuit becomes equal to the predicted value. This makes it possible to eliminate the influence of deviation in position of the resistances printed on the diaphragm portion 22, and adjust the output voltage from the amplification circuit such that there occurs no drift in output of the pressure sensor due to a change in the ambient temperature.

Let it be assumed that for the resistance values of the gauge resistances R1 to R4 and those of the offset adjustment resistances R6 and R7, R1=R2=R3=R4=R and R6=R7=Roff hold at all temperatures, i.e. that there is substantially no temperature-dependent change in each resistance value. On the other hand, as far as the resistance values of the adjustment resistances R8, R9 before trimming are concerned, it is assumed that R8=R9=Rp holds at a temperature T0, and $R8_{T1} \neq R9_{T1}$ holds at a temperature T1, i.e. that before trimming, a difference in change between the resistance values R8, R9 caused by a change in the temperature from the temperature T0 to the temperature T1 is responsible for temperature drift appearing in the output of the pressure sensor.

As for the output voltage E of the amplification circuit, the offset voltages e11, e21 before trimming, shown in FIG. 4, can be expressed by the following equations, respectively:

$$= \left( \frac{R2+R9}{R7+2R+R9} - \frac{R1+R8}{R6+2R+R8} \right) \frac{Rg}{Rg+R5} Vcc \cdot A \quad (1)$$

$$= \left( \frac{R2+R9_{T1}}{R7+2R+R9_{T1}} - \frac{R1+R8_{T1}}{R6+2R+R8_{T1}} \right) \frac{Rg}{Rg+R5} Vcc \cdot A \quad (2)$$

wherein Rg represents the overall resistance value exclusive of the span adjustment resistance R5, i.e. Rg=(R7+R4+R2+R9) (R6+R3+R1+R8)/(R1+R2+R3+R4+R6+R7+R8+R9). A represents the gain of the amplification circuit.

When e11<e21 holds for the offset voltages e11, e21 obtained in the measurement step (3), the resistance R8 connected to the output terminal 3 on the −OUT side is subjected to trimming such that the resistance value thereof is increased, whereas when e11>e21 holds, the resistance R9 connected to the output terminal 4 on the +OUT side is subjected to trimming such that the resistance value thereof is increased.

When e11<e21 holds for the offset voltages e11, e21, first, the resistance value $R9_{T1}$ at the temperature T1 is calculated from {equation (2)−equation (1)}.

A resistance change ΔR corresponding to a temperature change amount ΔT (=T1−T0) is expressed as follows:

$$\Delta R = R9_{T1} - R9 = R9_{T1} - RP \quad (3)$$

Now, when a temperature coefficient of the adjustment resistances R8, R9 is represented by kpt, and the resistance value of the adjustment resistance R8 after trimming is represented by R8t, there holds the following equation:

$$R8t \; kpt \; \Delta T = \Delta R \quad (4)$$

Further, from the initial assumption there is derived the following equation:

$$R8_{T1} = R8 \; kpt \; \Delta T + R8 \quad (5)$$

Therefore, by substituting the equations (1), (2), (3), (5) into the equation (4) expanded by using the trimmed resistance value R8t and then rearranging the resulting equation, it is possible to obtain a change amount $\Delta e11_{R8t}$ of the output voltage of the amplification circuit, which corresponds to the amount of change between the resistance values before and after trimming.

However, the output voltage $\Delta e11_{R8t}$ of the amplification circuit determined as above is only a predicted value obtained under the assumption of R8=R9=Rp, and hence different from the value e11 obtained from actual measurement of the output voltage of the amplification circuit. Further, by substituting the trimmed resistance value R8t into the adjustment resistance R8 in the equation (1), the output voltage change $\Delta e11_{R8t}$ caused by resistance trimming executed on the diaphragm is obtained by the following equation (6):

$$\Delta e11_{R8t} = \left( -\frac{R1+R8t}{R6+2R+R8t} + \frac{R1+R8}{R6+2R+R8} \right) \frac{Rg}{Rg+R5} Vcc \cdot A \quad (6)$$

Therefore, a predetermined voltage Vcc (power supply voltage under an actual use environment: e.g. 5V) is applied to one end of the Wheatstone bridge circuit of the pressure sensitive section via the span adjustment resistance R5, and the adjustment resistance R8 is trimmed while monitoring the current output voltage E of the amplification circuit until the output voltage E agrees with the calculated predicted value $e11_{R8t}$ (=$e11+\Delta e11_{R8t}$), whereby the accurate output adjustment of the amplification circuit can be performed without any need to directly measure the resistance value of the adjustment resistance R8 to be trimmed.

For the offset voltages e11, e21 obtained in the measurement step (3), when e11>e21 holds, a change amount $\Delta e11_{R9t}$ of the output voltage from the amplification circuit, which corresponds to the amount of change between the resistance values before and after trimmings, is obtained from a resistance value R9t of the trimmed adjustment resistance R9 by the following equation (7):

$$\Delta e11_{R9t} = \left( \frac{R2+R9t}{R7+2R+R9t} - \frac{R2+R9}{R7+2R+R9} \right) \frac{Rg}{Rg+R5} Vcc \cdot A \quad (7)$$

Therefore, the adjustment resistance R9 is only required to be trimmed until the output voltage E after trimming agrees with the value $e11_{R9t}$ (=$e11+\Delta e11_{R9t}$). It should be noted that in the second embodiment, since the span adjustment resistance R5 is short-circuited (R5=0) by the wiring pattern 228, the term {Rg/(Rg+R5)} of each of the equations (6), (7) is equal to "1", and hence can be ignored.

(5-2) Trimming of the Span Adjustment Resistance

As shown in FIG. 3, the span adjustment resistance R5 is serially connected to the gauge resistance circuit. In the present embodiment, in trimming of the span adjustment resistance R5, the power supply voltage Vcc is changed to thereby measure an offset voltage.

First, based on the span voltage (e13−e11) of the amplification circuit measured in the step of span measurement and the desired offset voltage (e2−e1), a new voltage value Vcct (=Vcc+ΔVcc) to be applied to the pressure sensitive section by the power supply is calculated by using the following equation (8):

$$Vcct = \frac{e13-e11}{e2-e1} \frac{Pmax}{P1} Vcc \quad (8)$$

Then, the predetermined power supply voltage Vcc (=5V) is applied to the pressure sensitive section in a state of the span adjustment resistance R5 being short-circuited by the wiring pattern 228, and the level of a desired output voltage $e11_{R5t}$ to be obtained by trimming is measured. Thereafter, the wiring pattern 228 is cut through by a laser beam, and then trimming is performed similarly to the trimming method described in (4-2) Trimming of PCT Resistances, it is possible to accurately trim the span adjustment resistance R5 without additionally providing the electrode pad 225, and further eliminate the influence of deviation in position of the resistances printed on the diaphragm portion 22 on the span adjustment.

In the following, description will be given of a procedure of calculating the new voltage value Vcct by using the equation (8), when the power supply voltage Vcc is changed to measure of the offset voltage. In measuring the span voltage (e12−e11) of the amplification circuit of the pressure sensor, a ratio ΔVout of an error in the span voltage (e12−e11) to the desired offset voltage (e2−e1) to be obtained when the resistance R5 is trimmed is expressed by the following equation (9):

$$\Delta Vout = \frac{(e12 - e11) - (e2 - e1)}{e12 - e11} \quad (9)$$

In measurement of the span voltage E of the pressure sensor, the span adjustment resistance R5 is short-circuited by the wiring pattern 228 before execution of the trimming for span adjustment. For this reason, a voltage Vg applied to the gauge resistance circuit formed as the Wheatstone bridge is equal to the predetermined power supply voltage Vcc (=5V), and hence the span voltage (e12-e11) measured at the amplification circuit gives a span voltage to be obtained in the state of the predetermined power supply voltage Vcc being applied to the gauge resistance circuit. Further, since the span voltage E is proportional to the voltage Vg applied to the gauge resistance circuit, a voltage Vgt to be applied to the gauge resistance circuit when the span adjustment resistance R5 is trimmed after cutting the wiring pattern 228 can be expressed by the following equation (10):

$$Vgt=(1-\Delta Vout)Vcc \quad (10)$$

However, during the trimming, since only the offset value E output from the amplification circuit can be measured, it is impossible to determine whether or not an actual offset voltage Vgt after the trimming agrees with the calculated value obtained from the equation (10).

To overcome this problem, when the pressure sensor is in actual use, the power supply voltage Vcc is changed for trimming of the resistance R5, and a calculable power supply voltage, such as Vcct expressed as a new power supply voltage by the equation (8), is applied as an initial power supply voltage, since the power supply voltage Vcc is fixed e.g. at 5V, and even when the power supply voltage is changed for span adjustment, so long as the ratio $\Delta Vout$ of the error determined by the equation (9) is valid, proper trimming is possible.

More specifically, the new power supply voltage Vcct is determined such that the voltage Vgt applied to the gauge resistance circuit after trimming in the equation (10) becomes equal to Vcc by the following equation (11):

$$Vcc=(1-\Delta Vout)Vcct \quad (11)$$

The new power supply voltage Vcct is obtained by changing the above equation (11) into the following equation:

$$Vcct=Vcc/(1-\Delta Vout) \quad (12)$$

Further, from the equation (9) there is obtained the following equation:

$$1-\Delta Vout=(e2-e1)/(e12-e11) \quad (13)$$

Furthermore, as shown in FIG. 4, (e12-e11) can be expressed as follows:

$$(e12-e11)=(e13-e11)(Pmax/P1) \quad (14)$$

Accordingly, the right side of the equation (14) is substituted into the denominator of the right side of the equation (13), and then the equation (13) is substituted into the equation (12). As a result, the new power supply voltage Vcct expressed by the equation (12) is obtained as the calculable voltage value expressed by the equation (8).

As described above, in the first place, the power supply voltage Vcct is calculated by using the equation (8). At the same time, the offset voltage obtained when the predetermined power supply voltage Vcc (e.g. 5V) is applied to the pressure sensitive section in the state of the span adjustment resistance R5 being short-circuited is measured, and the measured value is set to the desired output voltage $e11_{R5t}$ to be obtained by trimming.

Then, at the start of trimming performed while measuring the offset voltage, first, the wiring pattern 228 is cut through, whereby the voltage value Vcct calculated anew is applied to the pressure sensitive section via the span adjustment resistance R5.

Thereafter, the trimming of the span adjustment resistance R5 is continuously carried out, and when the output voltage of the amplification circuit agrees with the desired output voltage $e11_{R5t}$, the trimming is stopped.

Thus, it is possible to accurately trim the span adjustment resistance R5 without additionally providing the electrode pad 225.

As described heretofore, according to the present invention, trimming of the adjustment resistances on the diaphragm portion is performed in the state of the amplification circuit being connected to the diaphragm portion. This makes it possible to accommodate adjustment deviation on the amplification circuit side by adjustment on the diaphragm side, whereby offset, span, and temperature compensation adjustments which have been conventionally performed on the diaphragm side as well as an offset adjustment and the like which have been performed on the amplification circuit side can be achieved by executing the adjustment process on the diaphragm side only once, simplifying the adjustment process and thereby reducing manufacturing costs.

Further, since it is possible to determine the amount of trimming of all the adjustment resistances based on the output voltage of the amplification circuit, management of adjustment steps is facilitated. Moreover, it is no longer necessary to form additional electrodes pad on the diaphragm portion to carry out trimming of the adjustment resistances, and at the same time it is possible to eliminate the influence of deviation in position of the printed resistance pattern on the trimming of the adjustment resistances.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of adjusting a pressure sensor having a pressure sensitive section including a Wheatstone bridge circuit attached to a pressure application surface thereof, the pressure application surface being strained by pressure introduction of a medium to be measured, the Wheatstone bridge circuit being formed by first to fourth gauge resistances each having a resistance value varying according to an amount of strain of the pressure application surface, and an offset adjustment resistance, a temperature-compensating adjustment resistance, and a span adjustment resistance, which are attached to a non-strainable surface of the pressure sensitive section, the offset adjustment resistance and the temperature-compensating adjustment resistance being incorporated in the Wheatstone bridge circuit, the span adjustment resistance being arranged between the Wheatstone bridge circuit and a power supply, and an amplification circuit for amplifying a pressure detection signal from the pressure sensitive section, the method comprising:

a measurement step of measuring a rate of change in an output voltage of the amplification circuit responsive to a change in a pressure applied to the pressure application surface, and a temperature drift of an offset voltage of the amplification circuit, the offset voltage varying in accordance with a change in an ambient temperature at atmospheric pressure, in a state of the pressure sensitive section and the amplification circuit being connected to each other;

a first trimming step of calculating a first trimming resistance value based on the measured temperature drift, and trimming the temperature-compensating adjustment resistance in a manner such that the temperature-compensating adjustment resistance agrees with the first trimming resistance value;

a second trimming step of calculating a second trimming resistance value based on the rate of change in the output voltage, and trimming the span adjustment resistance in a manner such that the span adjustment resistance agrees with the second trimming resistance value; and a third trimming step of trimming the offset adjustment resistance in a manner such that the output voltage on the amplification circuit side becomes equal to a desired offset voltage at atmospheric pressure.

2. The method of adjusting a pressure sensor, according to claim 1, including a step of trimming the offset adjustment resistance before execution of the measurement step, in a manner such that the output voltage of the amplification circuit becomes equal to the desired offset voltage at atmospheric pressure.

3. The method of adjusting a pressure sensor, according to claim 1, wherein the first trimming step includes calculating a length for trimming from the calculated first trimming resistance value, and trimming the temperature-compensating adjustment resistance by the calculated length.

4. A method of adjusting a pressure sensor, according to claim 1, wherein the first trimming step includes trimming the temperature-compensating adjustment resistance while monitoring a resistance value of the temperature-compensating adjustment resistance, in a manner such that the temperature-compensating adjustment resistance agrees with the first trimming resistance value.

5. The method of adjusting a pressure sensor, according to claim 1, wherein the first trimming step includes calculating a predicted value of the output voltage of the amplification circuit to be output when a predetermined voltage is applied to the pressure sensitive section, based on the temperature drift of the offset voltage measured in the measurement step, and trimming the temperature-compensating adjustment resistance until an actual output voltage of the amplification circuit agrees with the predicted value.

6. The method of adjusting a pressure sensor, according to claim 1, wherein the second trimming step includes calculating a length for trimming, from the calculated second trimming resistance value, and trimming the span adjustment resistance by the calculated length.

7. The method of adjusting a pressure sensor, according to claim 1, wherein the second trimming step includes trimming the span adjustment resistance while measuring a voltage across the span adjustment resistance, in a manner such that a ratio of the voltage across the span adjustment resistance to a voltage of the power supply becomes equal to a ratio of a resistance value of the span adjustment resistance calculated from the second trimming resistance value to a resistance value of the Whearstone bridge circuit.

8. The method of adjusting a pressure sensor, according to claim 1, wherein the second trimming step includes calculating a value of a new voltage to be applied to the pressure sensitive section from the rate of change in the output voltage measured in the measurement step and the desired offset voltage, at the same time measuring a desired output voltage to be obtained by trimming by applying a predetermined voltage to the pressure sensitive section in a state of the span adjustment resistance being short-circuited, and thereafter trimming the span adjustment resistance while applying the new voltage to the pressure sensitive section by the power supply via the span adjustment resistance, until the output voltage of the amplification circuit agrees with the desired output voltage to be obtained by trimming.

* * * * *